June 10, 1952  S. C. PETRILLI  2,599,937
APPARATUS FOR FEEDING CANDY BARS
Filed May 28, 1945  5 Sheets-Sheet 1

INVENTOR.
Santy C. Petrilli
BY Moore, Olson & Trexler
attys.

June 10, 1952 S. C. PETRILLI 2,599,937
APPARATUS FOR FEEDING CANDY BARS
Filed May 28, 1945 5 Sheets-Sheet 5

INVENTOR.
Santy C. Petrilli
BY
Moore, Olson & Trexler
Attys.

Patented June 10, 1952

2,599,937

UNITED STATES PATENT OFFICE 2,599,937

APPARATUS FOR FEEDING CANDY BARS

Santy C. Petrilli, Chicago, Ill., assignor to General Candy Corporation, Chicago, Ill., a corporation of Illinois Application May 28, 1945, Serial No. 596,262

17 Claims. (Cl. 118—16)

This invention relates to means for feeding candy bar cores.

In the manufacture of the so-called chocolate-covered, peanut-coated candy bars the bars include an elongated, relatively slender and relatively soft candy bar core which is first coated with a sticky candy-like covering, and then peanuts are shaken onto this candy coating and adhere thereto. The peanut-covered bar is then rolled or agitated in a desired manner to embed the peanuts in the coating and to shape the bar to predetermined shape. Subsequently the peanut-coated bar is covered with chocolate and after solidifying is wrapped and packaged for sale. At the present time these rather delicate, soft candy cores are fed into a series of travelling trough-like receptacles, substantially the size of the candy cores, by a battery of operators, the cores being taken from bins and fed by hand into the travelling troughs. It takes many girls continuously to fill a series of parallel travelling troughs. These troughs preferably pass from an upper elevation in one part of the building, downwardly at a very steep angle and thence move into juxtaposition to a travelling belt, during a part of which travel they deposit the candy cores in spaced, parallel relation on the belt. The spaced candy cores on the travelling belt then pass under a station where a tacky candy coating is deposited upon each core, and then subsequently means is provided for applying peanuts to the tacky coating, as hereinbefore mentioned.

Among the objects of the present invention is to provide means whereby a plurality of these rather fragile candy cores may be placed in parallel, juxtaposed relation and thereafter means is provided which will automatically and without the intervention or presence of an operator space the candy bar cores and deposit them in this predetermined spaced relation onto either a travelling conveyor upon which they are coated with the tacky candy coating and thereafter the peanuts, or alternatively wherein they are placed in spaced relation in the series of travelling troughs which then descend downwardly, or ascend upwardly, as desired, to any predetermined point for depositing the same in maintained spaced relation upon another travelling conveyor for subsequently coating with candy coating and peanuts, as hereinbefore described.

Yet another object of the invention resides in the means for providing any desired manner of spacing of the candy bar cores in a manner whereby a number of operators are eliminated, and whereby it is not necessary for the operators to touch the candy bars, thereby promoting sanitation and economy.

Yet another object of this invention is to provide a processing device for pressing candy cores or centers of elongated bar-like shape, in predetermined uniform spaced relation into a traveling bed of peanuts whereby the centers or cores are substantially buried in the peanuts.

Yet another object of the invention resides in providing a process and apparatus for pushing or embedding elongated candy centers or bars into a traveling bed of peanuts in such a manner that the bars are spaced uniformly in said bed, and are substantially covered or submerged therein, and for thereafter passing said bed under an enrober mechanism or a source of tacky substantially flowable candy coating which is adapted to be deposited upon the candy centers or cores so embedded in the peanuts so that the tacky coating will flow onto, over, and around and between the candy centers or bars and the surrounding peanuts whereby to form a candy peanut covering substantially enclosing and adhering to the candy bars or centers.

Yet another object of the invention is to provide in association with a mechanism for uniformly spacing and feeding a plurality of bar-like candy centers or cores; a further mechanism for dropping said candy centers or cores in uniformly spaced relation onto a traveling bed of peanuts and for automatically pressing said bars or cores into a bed of peanuts whereby substantially to cover the bars or cores with said peanuts as they are traveling.

These and other objects of the invention will be apparent from the perusal of the following specification when taken in connection with the accompanying drawings, wherein.

Figures 5, 6:
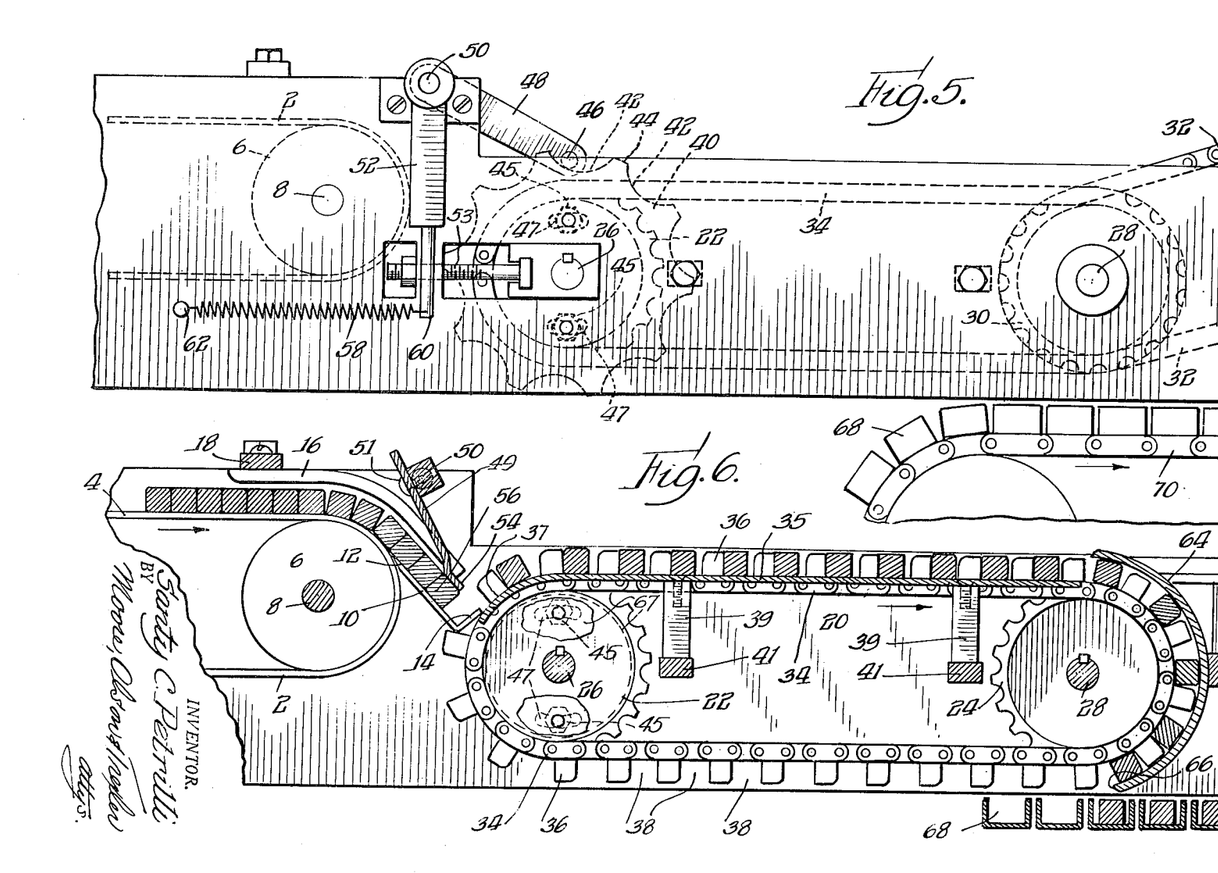
Fig. 5 is a side view showing the chain and sprocket drive from the motor.
Fig. 6 is a horizontal sectional view taken on the line 6—6 of Fig. 4.

Referring particularly now to Figs. 5 and 6 of the drawings, the invention includes an endless belt 2, the upper reach 4 of which travels to the right and passes in clockwise fashion around the pulley 6 rotating with the shaft 8. This endless belt or feeding means is driven in any desired manner in synchronism with the remainder of the device now to be described, and is arranged in preferably horizontal disposition so that a multitude of the candy bar cores may be placed thereupon in parallel, juxtaposed relation. That is, an operator merely places a bunch of the candy bars on this belt and the only demand is that they be initially placed in parallel relation thereon. The operator need pay no further attention to these bars once they are so placed because the feeding belt and its associated mechanism will thereafter feed these bars one at a time and position them in spaced relation upon an associated feeding means, which may either further deposit them in an additional belt provided with troughs on its upper surface, or deposit them directly upon the coating belt hereinafter to be described. In either event, the spaced parallel arrangement of the candy bars is maintained and no further manual positioning of them is required. By means of this mechanism a considerable number of operators is dispensed with and also a sanitary arrangement is provided.

By reference to Fig. 6 it will be noted that midway between the top and central portion of the belt 2 as it passes around the pulley 6 is arranged a downwardly inclined receiving plate or slide 10 which has a bevelled edge 12 which lies very close to the upper surface of the traveling belt so that the candy bars in close juxtaposition, as shown in Fig. 6, will be diverted from the surface of the belt onto this inclined feeding or slide plate 10. The plate 10 is provided with the right angled flange 14 which is adapted to receive the bars as they pass the arresting mechanism soon to be described. In addition, a suitable curved guide 16 overlies the path of travel of the juxtaposed candy bars as they move along the top of the belt and down the slide plate 10. This guide is made fast to the underside of a horizontal support 18.

Figures 1, 2:
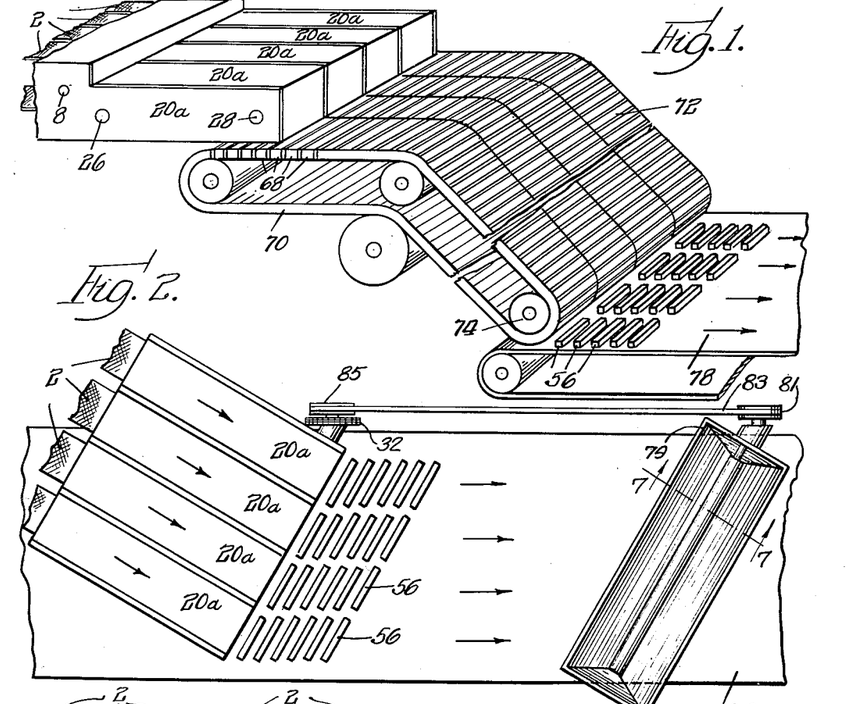
Fig. 1 is a view of the machine wherein the feeding mechanism is arranged parallel to the travel of the endless belts for depositing the bars in spaced relation upon the coating conveyor.
Fig. 2 is a view showing the machine as providing a diagonal arrangement with respect to the travel of the belts.
Figure 3:
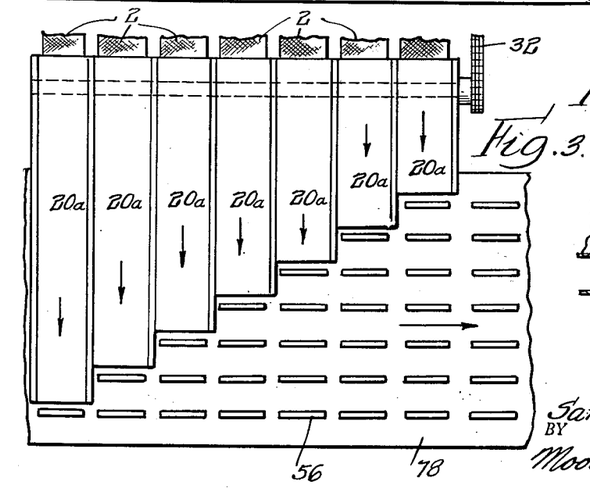
Fig. 3 is a diagrammatic view showing the machine arranged at right angles to the travel of the belt.
Figure 4:
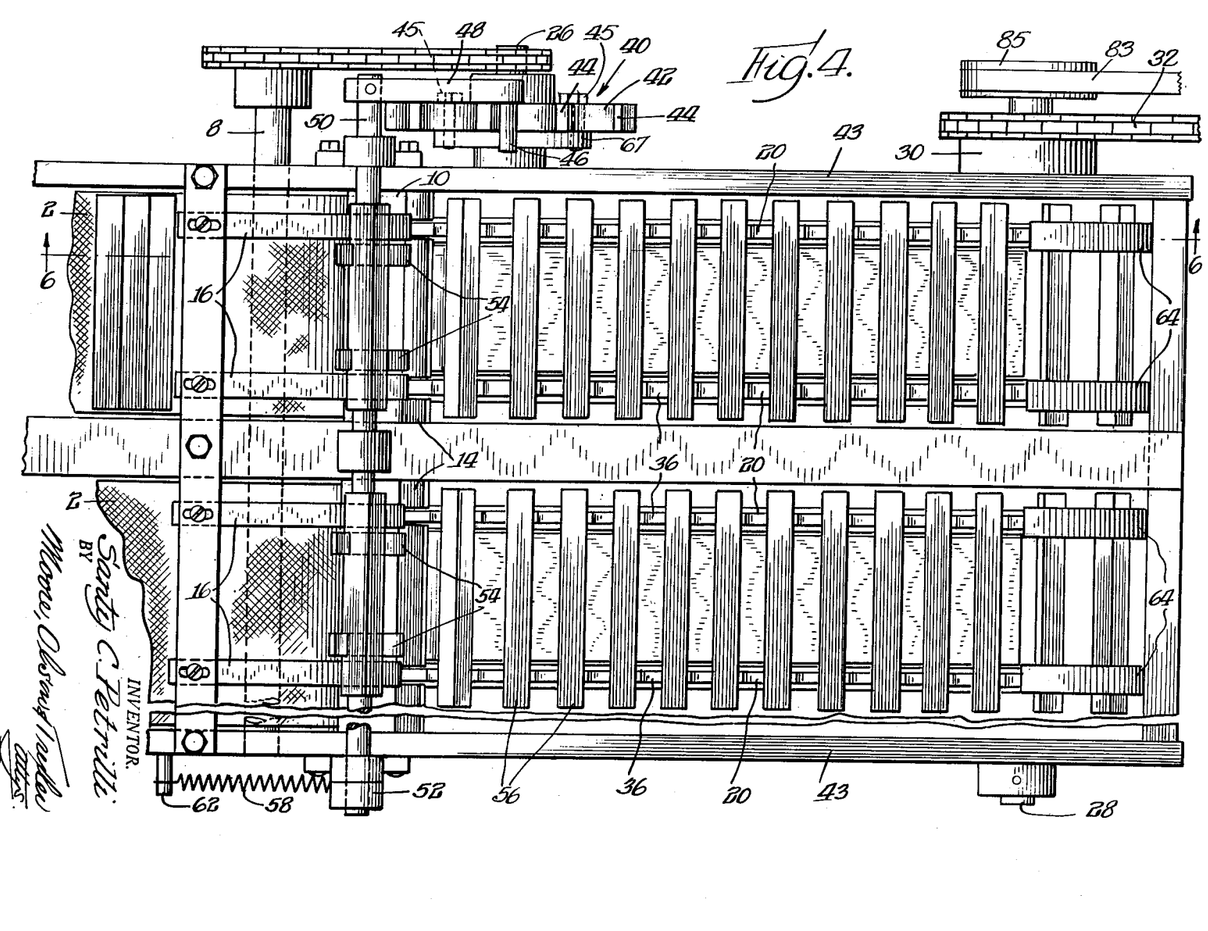
Fig. 4 is a top plan view of a pair of the spacing devices.

Cooperating with the discharge end of the slide plate 10 is preferably disposed a plurality of conveyors each including a plurality of endless chains or belts 20 which travel around spaced sprockets 22 and 24 which rotate with shafts 26 and 28. Shaft 28 has on it a sprocket 30 which in turn is driven by a belt 32 driven by a motor, not shown. There are two pairs of sprocket chains 20 which are arranged in spaced apart relation, as shown in Fig. 4. Each pair of sprocket chains and their associated sprockets may be housed in a housing 20a as shown in Figs. 1–3 if it is desired to do so. Each of these sprocket chains is made up of a plurality of pivotally interconnected links 34 and each link has outstanding therefrom a relatively square lug 36. The lugs of each pair of links register in spaced relation so as to provide spaced troughs or pockets 38 which pockets on the upper and lower reaches of the sprocket chains are of uniform width and are slightly larger than the cross sectional area of the candy bars. In passing around the ends of the sprockets as shown in Fig. 6, the pivotal interconnections between the links permit the pockets to widen considerably so as to receive between adjacent pairs of lugs one of the candy bars, as hereinafter referred to. The sprocket chains 20 are driven from the driven shaft 28 by means of the sprocket wheels 24, it being understood that there are two pairs of sprocket wheels on each of the shafts 28 and 26.

Means is provided for periodically dropping one of the series of contiguous or juxtaposed candy bars which slide down the incline 10 into the successive pockets of the feeding chains 20. This is accomplished by means of an additional cam wheel 40 mounted on the shaft 26. This cam wheel has a series of equally spaced cam-like depressions 42 with intervening high points 44, which equally spaced series of depressions and high points 42 and 44 act upon a roller 46 on the end of a lever 48 pivoted as at 50. The pivot 50 has a plurality of arms 49 secured thereto as by screws or rivets 51 and each having its inner end formed as at 54 as a flat stop which is adapted to overlie the lowermost of the series of candy bars such as 56. A spring 58 is connected as at 60 to an arm 52 secured to the pivot 50 and is also connected to an anchorage 62 to hold the stops 54 normally in position to prevent candy bars from dropping onto the receiving shelf 14 of the slide plate 10. When the arm 48 is raised the stop 54 will likewise be raised to let a single candy bar drop onto the pocket-like shelf 14. Preferably the stops 54 are duplicated at opposite sides of the slide 10 so as to maintain the candy bars in parallelism as they are fed into the receiving pocket 14, the single cam wheel 40 serving to actuate all of the stops 54 that are affixed as at 51 to the common shaft 50 forming the pivot for the lever 48. Immediately upon the deposition of a candy bar into the pocket 14, the spring and the cam mechanism restore the stops back to closed position to prevent the next succeeding candy bar from dropping. The cam mechanism 42 is timed with relation to the feeding of the sprocket belts 20 and the belt 2 so that the candy bars 56 are dropped periodically so as to place one bar in each pocket 38. In this manner the candy bars in parallel contiguous or juxtaposed relation are automatically fed into the pockets 38 of the belt 20 in periodic, spaced relation so that the bars are always maintained in this uniform spacing and in parallel relation.

The bars, as shown in Fig. 6, travel to the right and pass under the arcuate guide plate 64 until they come to the end 66 of the guide plate, whence they are free to drop, one each, into the successive trough-like pockets 68 of the belt conveyor mechanisms 70, see Figs. 1, 5 and 6. As shown therein, this belt conveyor consists of a series of articulated troughs providing pockets each of the general cross sectional area of a candy bar, so that each trough receives a candy bar and in this manner the candy bars are deposited into the troughs in parallel, definitely spaced relation.

Figure 7:
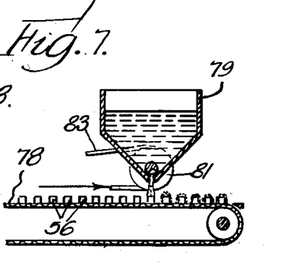
Fig. 7 is a sectional view taken on the line 7—7 of Fig. 2 and showing the means for depositing coating of caramel preparation upon the candy bars.

The trough-like conveyor 70 may feed the spaced candy bars to any desired location. In the present instance, as shown in Fig. 1, a reach 72 of the trough-like conveyor descends at any desired angle downwardly, as for instance from one story of a factory to the next lower story, or may even move upwardly, if desired, and passes around a pulley 74 at which time the candy bars 56 are dumped upon the endless belt 78. In this instance it is to be noted that the bars 56 are dumped in such a manner that they are maintained in definitely spaced relation on the top of the conveyor belt 78. This belt has associated with it mechanism 79 including a conventional valve for periodically dumping or discharging a charge of tacky or sticky candy coating on each one of the individual candy bars so that the coated candy bar core then travels to the next station on the belt 78 where it is showered with a charge of peanuts. The shaft of the valve in the mechanism 79 is provided with a pulley 81 (Figs. 2 and 7) which may be connected to the valve through a universal joint when the mechanism 79 is obliquely disposed. A belt 83 drives the pulley 81 from a pulley 85 (Figs. 2 and 4) on the drive shaft 28 of the endless chains or belts 20 to operate the valve in timed relation to the candy bar release arms 49 (which are timed relative to the chains 20). The connection of the pulley 85 to the last mentioned drive shaft also may be through a universal joint. From there on the peanut coated candy bars may be treated in any desired manner well known in the art, such for instance as by feeding them down an inclined shaker conveyor to shake the bars and firmly embed the peanuts into the coating thereof.

In some instances the belts 20, instead of being arranged in parallelism, as shown in Fig. 1, with respect to the trough-like conveyor 70, may be arranged at an inclination thereto or may be arranged at right angles thereto, as shown in Fig. 3. Fig. 2 shows the feeding belts 20 arranged diagonal to the travel of the belts 78. In Fig. 3 the right angle arrangement of the belts 20 with respect to the belts 78 deposits the candy bars 56 in parallel spaced relation on the belt or belts 78. In each instance the depositing mechanism 79 is arranged parallel to the candy bars and to the surface of the belt, being diagonally or obliquely disposed in relation to the length of the belt as shown in Fig. 2 and parallel to the length of the belt in the arrangement shown in Fig. 3.

In order to support the candy bars 56 as they are carried across the upper reach of the belt 34 I provide a plate 35 which is curved at the entrance end 37 thereof and is supported by two vertical posts 39 which are attached to horizontal cross members 41 which are in turn fixed to the side frames 43 of the machine.

Adjustable means are provided to time the movement of the arms 49 relative to the sprocket chains 20 to release the candy bars one by one into the succeeding sprockets of each pair of chains. To this end the cam wheel 40 is rotatable on the shaft 26 and a disc 67 (Figs. 4 and 6) is fixed to the shaft 26. A pair of bolts 45 fits through a pair of arcuate slots 47 (Figs. 5 and 6) and is threaded into the disc 67. Tightening of the bolts clamps cam wheel 40 against the disc 67 in any desired position of adjustment. The chains 34 have the usual means 53 for taking up the slack therein.

Figure 8:
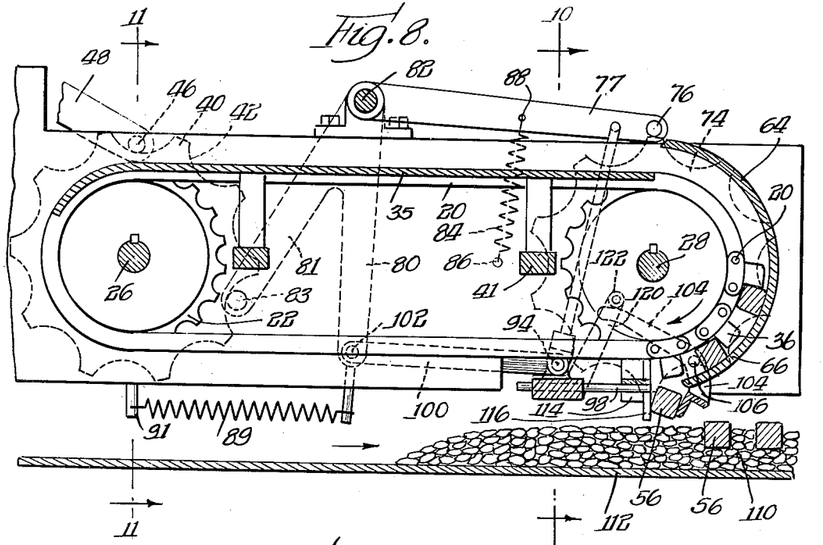
Fig. 8 is a side sectional view of an additional mechanism associated with the bar spacing means of Fig. 6 which is arranged to spacedly embed the bars or candy cores into a traveling bed of peanuts.
Figure 9:
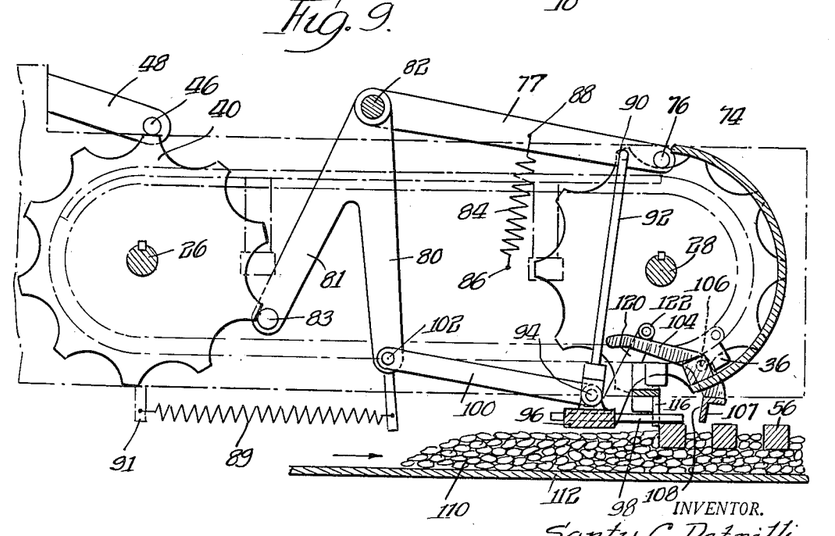
Fig. 9 is a corresponding view showing the mechanism in a different position.

Referring now to the mechanism shown in Figs. 8 to 12 inclusive:

Figs. 8 and 9 particularly show the mechanisms at the right hand portion of Fig. 6 modified so as to include means for depositing the spaced candy bars in maintained spaced relation onto a traveling surface carrying a bed of peanuts and for pressing the candy centers or bars downwardly into this bed of peanuts whereby the bars are substantially covered and without interruption to the travel of the bed of peanuts. In this connection, the chain mechanism 20 carrying the lugs 36 is identical to the mechanism 20 shown in Fig. 6, and in addition, a cam 74 is mounted on shaft 28 to turn therewith. This cam operates a roller 76 on the end of a lever arm 77 which is pivoted on the shaft 82. A link 92 is connected at 90 to the arm 77 and at its lower end is pivotally connected at 94 to a cross bar 96 having an aperture therein which carries a rod 98. In addition this bar 96 has pivotally connected thereto an additional link 100 which in turn is pivotally connected as at 102 to the arm 80 of a bell crank lever on the shaft 82. This link 100 lies parallel to or substantially parallel to the lever 77. The arm 80 is shifted in timed relation with the raising of the arm 77 and this action is due to the cam 40 on shaft 26. A roller 83 supported on the arm 81 of the bell crank arm 80 engages the periphery of the cam 40 to move the roller 83 in and out and shift the arm 100 back and forth to move the pins 98 inwardly over the candy bars 56. A spring 89 is connected to the lower end of the lever arm 80 and its opposite end to the fixed pin 91.

Additionally at the terminal end 66 of the guideway 64 is provided a curved lever 104 pivoted as at 106 on a stationary part of the machine. Lever 104 carries at its lower end a sort of an inverted V-shaped candy release device 107 which has a surface 108 which is adapted to block and hold a candy bar 56 in the position shown in Fig. 8 or is adapted to swing away from the end 66 of the guide 64 and release the candy bar so that it may drop precisely as shown in the drawing into a bed 110 of peanuts moving along on a traveling surface or belt 112. In addition a stationary part of the machine is provided with a support 114 which carries a vertical bar 116 which acts as a stop for the candy bar 56 to permit it to be clutched or held between said bar 116 and the angle-shaped control member 107. This bar 116 is slotted to permit the rod 98 to slide therealong between the position shown in Fig. 8 and the position shown in Fig. 9. This bar as has before been pointed out is controlled by the sliding reciprocating cross bar 96 and which bar is adapted to be depressed to carry the rods 98 downwardly against the upper surface of a candy bar 56 whereby to press it downwardly and embed it into the underlying bed of peanuts. In addition the bar 96 likewise carries an arm 120 which is provided with a roller 122 at its outer end, which roller acts upon the curved lever 104 during the actuation of the head 94 to actuate the lever 104 to either hold the candy bar as shown in Fig. 8 or release same to be dropped into the bed of peanuts as shown in Fig. 9.

Figure 10:
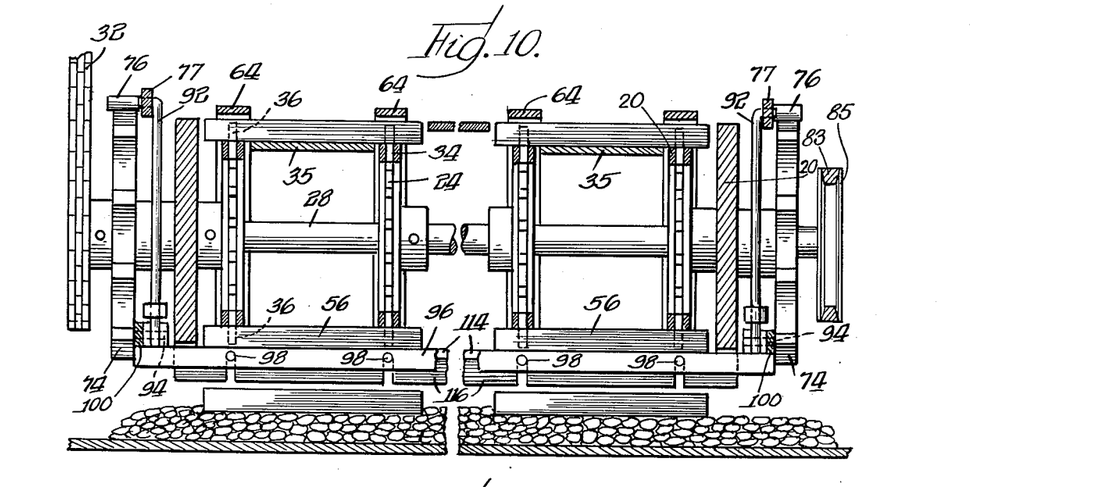
Fig. 10 is a section on line 10—10 of Fig. 8.
Figure 11:
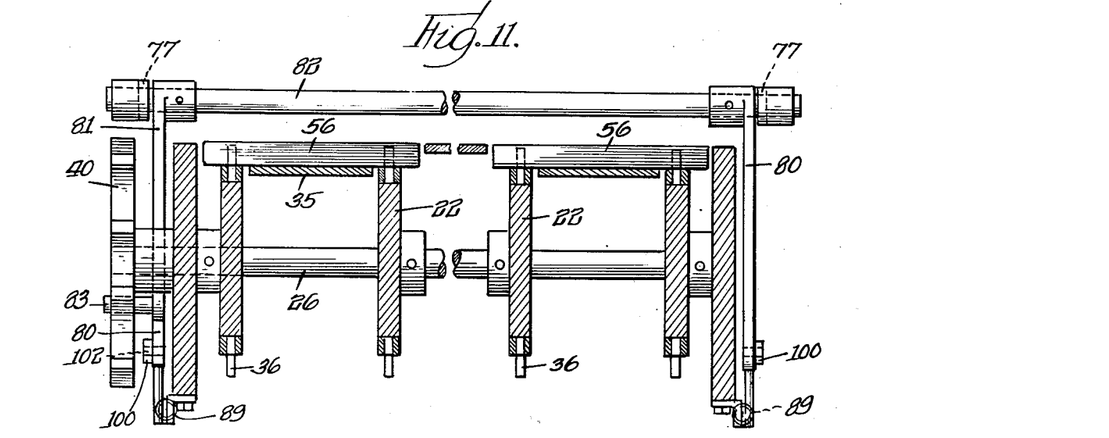
Fig. 11 is a section on line 11—11 of Fig. 8.
Figure 12:
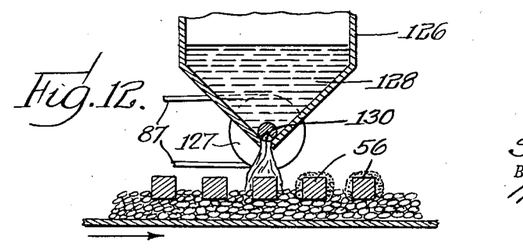
Fig. 12 is a semi-diagrammatic view of an enrober or other means for depositing tacky or sticky caramel or chocolate coating or candy coating on the bars when embedded in the peanuts as shown in Fig. 9.

As the conveyor 112 carrying the bed of peanuts on its upper surface into which have been embedded the candy bars 56 moves to the right as shown in Fig. 12, the candy bars embedded in the bed of peanuts will move under the hopper 126 containing a sticky candy coating 128 which through appropriate mechanism is automatically dropped as a gob or shot onto each candy bar as is well known in the art, the valve mechanism being driven by a pulley 127 (Figs. 10 and 12)

engaged by the belt 83 and driven by the pulley 85 as mentioned with regard to the first embodiment. When this happens, the sticky candy coating will trickle down amongst the peanuts surrounding the candy bar which has heretofore been embedded in the peanuts, will adhere to the bar and to the peanuts and thus provide the bar with a candy coating.

After the peanut coated bars have passed under this coating mechanism, they may be delivered to a desired destination for packaging, but preferably are subjected to further treatment to more thoroughly embed the peanuts into the bars and to shape the peanut coated bars and give them a final additional coating if so desired.

Obviously the invention is not limited to the specific details of construction disclosed herein but is capable of other modifications and changes without departing from the spirit and scope of the appended claims.

Having thus described my invention, what I claim as new and desire to secure by Letters Patent is:

1. Means for producing coated candy bars, comprising feeding means adapted to receive and feed a plurality of juxtaposed, parallel, relatively fragile, elongated candy cores of relatively small cross section along a predetermined path, an endless series of interconnected spaced apart troughs substantially of the same length and cross section as the candy bars, said troughs each being adapted to receive and support a candy bar therein, means for advancing said series of troughs along a predetermined path, and mechanism associated with the first mentioned feeding means and the endless series of troughs for successively and periodically feeding individual candy bars from the first mentioned feeding means and depositing a single bar into a single trough of the series of interconnected spaced apart troughs, said mechanism including an inclined plate supporting the cores throughout their lengths and a member having a flat candy core contacting portion periodically clamping a candy core against said inclined plate.

2. In a candy bar feeding mechanism, the combination of means for feeding a plurality of juxtaposed, parallel, relatively fragile candy bar cores along a predetermined path, second feeding means including an endless series of spaced apart troughs disposed adjacent the discharge end of the first mentioned feeding means, and operable mechanism disposed between said first and second feeding means for automatically and periodically feeding a succession of candy bars in spaced parallel relation from the first feeding means into the troughs of the second feeding means whereby the candy bars are supported and fed along a predetermined path in parallel, predetermined spaced relation, said mechanism including an inclined plate supporting the cores throughout their lengths and a member having a flat candy core contacting portion periodically clamping a candy core against said inclined plate.

3. In a candy bar feeding machine, means for feeding a plurality of parallel disposed candy bars, a second feeding means including a plurality of spaced apart troughs of a cross section each slightly larger than the cross section of a candy bar, means for feeding said second trough-like feeding means along a predetermined path, and periodically operating automatic mechanism associated with said first and second feeding means adapted periodically and in synchronized relation with the first and second means to feed a succession of said juxtaposed parallel candy bars periodically and in spaced relation, one into each trough wherein it is supported for feeding, said mechanism including an inclined plate supporting the cores throughout their lengths and a member having a flat candy core contacting portion periodically clamping a candy core against said inclined plate.

4. A machine for processing candy bars comprising an endless belt, means for driving the same, said belt being adapted to receive a plurality of juxtaposed candy bars disposed in parallel relation thereon, endless feeding means comprising a pair of endless sprocket chains adapted to move about pairs of spaced sprockets, a pair of said sprockets being spaced below and adjacent the discharge end of the endless belt, said sprocket chains each including spaced apart, upstanding lugs disposed in registration to provide spaced pockets, each adapted to receive and support therein a candy bar, a guide plate disposed at the discharge end of said endless belt down which the juxtaposed candy pars are adapted to slide by gravity, and periodically operated stop mechanism adapted individually to release the candy bars and to cause them to be fed individually into the spaced pockets formed by the lugs of the sprocket chains in timed relation to the movement of the sprocket chains, said stop mechanism including a flat plate-like portion spaced above said guide plate, and means for periodically clamping said plate-like portion against candy bars on said guide plate in timed relation with said first mentioned endless feeding means.

5. The combination comprising feeding means, means disposed above the path of travel of said feeding means for periodically depositing materials thereon as the feeding means passes thereunder, additional feeding means adapted to feed a succession of contiguous, substantially parallel candy bars along a substantially horizontal path, transfer means adapted to feed such succession of candy bars from the additional feeding means in spaced relation, carrying means for receiving the bars from said transfer means and carrying said bars to said first mentioned feeding means in spaced relation, and means operating said transfer means and said depositing means in timed relation whereby said candy bars are fed onto said first mentioned feeding means in spaced relation and in synchronized movement with the periodic deposit of material with relation to said first mentioned feeding means whereby said material is deposited exactly upon each one of said predetermined spaced candy bars as they are fed along by said first mentioned feeding means.

6. The combination comprising feeding means, means disposed above the path of travel of said feeding means for periodically depositing materials thereon as the feeding means passes thereunder, additional feeding means adapted to horizontally feed a succession of contiguous, substantially parallel candy bars, transfer means adapted to feed such succession of candy bars from the additional feeding means in spaced relation, carrying means for receiving the bars from said transfer means and carrying said bars to said first mentioned feeding means in spaced relation, and means operating said transfer means and said depositing means in timed relation whereby said candy bars are fed onto said first mentioned feeding means in spaced relation and in synchronized movement with the periodic deposit of material with relation to said first mentioned feeding means whereby said material is deposited exactly upon each one of said predetermined spaced candy bars as they are fed along by said first mentioned feeding means, said first mentioned feeding means being disposed in oblique relation to said second mentioned feeding means, and said depository means being obliquely disposed to said first mentioned feeding means and in substantial parallelism with the candy bars carried by said first mentioned feeding means.

7. The combination comprising feeding means, means disposed above the path of travel of said feeding means for periodically depositing materials thereon as the feeding means passes thereunder, additional feeding means adapted to feed a succession of substantially parallel, contiguous candy bars, along a substantially horizontal path, transfer means adapted to feed a succession of candy bars from the additional feeding means in spaced relation, carrying means for receiving the bars from said transfer means and carrying said bars to said first mentioned feeding means in spaced relation, and means operating said transfer means and said depositing means in timed relation whereby said candy bars are fed onto said first mentioned feeding means in spaced relation and in synchronized movement with the periodic deposit of material with relation to said first mentioned feeding means whereby said material is deposited exactly upon each one of said predetermined spaced candy bars as they are fed along by said first mentioned feeding means, said additional feeding means being disposed at right angles to said first mentioned feeding means, and said depository means being disposed at right angles to said first mentioned feeding means and substantially parallel to the candy bars carried by said first mentioned feeding means.

8. In a candy bar feeding machine, first means for feeding a plurality of parallel disposed candy bars along a predetermined path, a second feeding means including a plurality of spaced pockets of a cross section each slightly larger than the cross section of a candy bar, means for advancing said second pocket-like feeding means along a predetermined path, and automatic mechanism associated with said first and second feeding means adapted periodically and in synchronized relation with the first and second means to feed a succession of said juxtaposed parallel candy bars periodically and in spaced relation from said first feeding means to said second feeding means, one into each pocket, means forming a continuously traveling bed of peanuts underlying the second feeding means, means for individually depositing the succession of candy bars in predetermined uniform spaced relation onto said continuously traveling bed of peanuts and for pressing each candy bar into said bed of peanuts as the candy bar and bed of peanuts is moving.

9. In a candy bar feeding machine, first means for feeding a plurality of parallel disposed candy bars along a predetermined path, a second feeding means including a plurality of spaced pockets of a cross section each slightly larger than the cross section of a candy bar, means for advancing said second pocket-like feeding means along a predetermined path, automatic mechanism associated with said first and second feeding means adapted periodically and in synchronized relation with the first and second means to feed a succession of said juxtaposed parallel candy bars periodically and in spaced relation from said first feeding means to said second feeding means, one into each pocket, means forming a traveling bed of peanuts underlying the last mentioned feeding means, means for individually depositing the succession of candy bars in predetermined uniform spaced relation onto a continuously traveling bed of peanuts and for pressing each candy bar into said bed of peanuts as the candy bar and bed of peanuts is moving, and means for thereafter depositing substantially flowable sticky candy coating onto each candy bar so embedded in the peanuts, whereby to cause said peanuts surrounding the candy bar to adhere to the candy bar.

10. In a candy bar feeding machine, first means for feeding a plurality of parallel disposed candy bars along a predetermined path, a second feeding means including a plurality of spaced pockets of a cross section each slightly larger than the cross section of a candy bar, means for advancing said second pocket-like feeding means along a predetermined path, and automatic mechanism associated with said first and second feeding means adapted periodically and in synchronized relation with the first and second means to feed a succession of juxtaposed parallel candy bars periodically and in spaced relation from said first feeding means to said second feeding means, one into each pocket, means for discharging each successive candy bar in predetermined spaced relation onto a continuously traveling bed of peanuts, and means for pressing the said candy bars into a bed of peanuts and for depositing a volume of flowable sticky candy coating upon each bar so deposited on a bed of peanuts whereby to adhere the peanuts to the bar.

11. In a candy bar feeding mechanism, the combination of first means for feeding a plurality of juxtaposed, parallel, relatively fragile candy bar cores along a predetermined path, a second feeding means comprising an endless series of spaced pockets disposed adjacent the discharge end of the first mentioned feeding means and having a discharge station, mechanism disposed adjacent to and cooperating with said first feeding means for automatically and periodically feeding a succession of candy bars in spaced parallel relation from the first feeding means into the pockets of the second feeding means whereby the candy bars are fed along a predetermined path in parallel, predetermined spaced relation to said discharge station, means at said discharge station for individually releasing each candy bar in synchronized predetermined movement, onto a continuously traveling bed of peanuts underlying said feeding means, and without interrupting the traveling movement of said second mentioned feeding means, and means for forcing each said candy bar into said bed of peanuts.

12. In a candy bar feeding mechanism, the combination of first means for feeding a plurality of juxtaposed, parallel, relatively fragile candy bar cores along a predetermined path, a second feeding means comprising an endless series of spaced pockets disposed adjacent the discharge end of the first mentioned feeding means, said second feeding means having a discharge station, and mechanism disposed adjacent said first and second feeding means for automatically and periodically feeding a succession of candy bars in spaced parallel relation from the first feeding means into the pockets of the second feeding means whereby the candy bars are fed along a predetermined path in parallel, predetermined spaced relation to said discharge station, means at said discharge station for individually releasing each candy bar in synchronized predetermined movement onto a continuously traveling bed of peanuts underlying said feeding means without interrupting the traveling movement of said second mentioned feeding means, and additional means for pressing each candy bar into the bed of peanuts into which said candy bars have been deposited while said bed continues to travel.

13. In a candy bar feeding mechanism, the combination of first means for feeding a plurality of juxtaposed, parallel, relatively fragile candy bar cores along a predetermined path, a second feeding means comprising an endless series of spaced pockets disposed adjacent the discharge end of the first mentioned feeding means, and mechanism disposed adjacent said first and second feeding means for automatically and periodically feeding a succession of candy bar cores in spaced parallel relation from the first feeding means into the respective pockets of the second feeding means whereby the candy bars are fed along a predetermined path in parallel, predetermined spaced relation, said second feeding means further including a pair of sprocket chains each including an endless series of spaced lugs forming said pockets and adapted to receive the candy bars therebetween and for feeding said spaced candy bars to another station, means for discharging the series of candy bars from the spaced lugs, and candy bar discharging mechanism associated with the discharge ends of said sprocket chains for dropping in spaced timed relation each candy bar so discharged from said lugs, and a means providing a bed of peanuts adapted to continuously travel beneath the discharge point of said sprocket chains whereby said candy bars so discharged will be dropped onto said bed of peanuts, and additional means associated with the discharge end of said sprocket chains for engaging each of said bars and pressing the same downwardly into said bed of peanuts while said bed of peanuts and bars therein are traveling.

14. In a candy bar feeding mechanism, the combination of means for feeding a succession of contiguous parallel candy bar cores along a predetermined path, said means including a first conveying means and a second conveying means, and means for automatically transferring candy bar cores from contiguous parallel relation on said first conveying means to a predetermined spaced parallel relation on said second conveying means, said transferring means including an inclined plate-like member, a guide means overlying said plate-like member and in substantially parallel spaced relation thereto, an intermittently operable member for periodically clamping a single candy bar core against said plate-like member, and means for operating said member and said second conveying means in timed relation.

15. A candy bar feeding mechanism comprising means for feeding candy bars in substantially contiguous parallel relation, a second feeding means, means including an inclined plate-like member, a guide member overlying said plate-like member and in predetermined spaced relation thereto, an intermittently operable member for periodically clamping a candy bar against said plate-like member and then releasing single candy bars onto said second named feeding means in predetermined spaced relation, a third feeding means carrying a bed of nuts, an arcuate plate-like member in predetermined spaced relation with an extremity of said second mentioned feeding means for retaining candy bars thereon, and a member adjacent said arcuate member and operable in timed relation with said second feeding means for periodically releasing a candy bar onto said third mentioned feeding means and forcing each said candy bar into the bed of nuts.

16. In a candy bar feeding mechanism, an endless conveying means for conveying candy bar cores in predetermined spaced parallel relation, a second endless conveying means underlying one extremity of said first named endless conveying means, means for retaining candy bar cores on said first named endless conveying means for changing their elevation and direction of movement at the extremity of said conveying means, means for releasing a single candy bar at this point for dropping it onto a traveling bed of peanuts on said second named conveying means, and means for embedding the candy bar core in the bed of peanuts.

17. In a candy bar feeding mechanism, an endless conveying means for feeding a succession of candy bar cores in substantially parallel spaced relation, a traveling bed of peanuts passing beneath one extremity of said endless conveying means and in close spaced relation thereto, means for individually releasing candy bar cores from said endless conveying means onto said traveling bed of peanuts, means for embedding the candy bar cores in said bed of peanuts, and means overlying said bed of peanuts for depositing a volume of flowable sticky candy coating upon each bar whereby to adhere the peanuts to the bar.

SANTY C. PETRILLI.

REFERENCES CITED

The following references are of record in the file of this patent:

UNITED STATES PATENTS

| Number | Name | Date |
|---|---|---|
| 334,274 | Norton | Jan. 12, 1886 |
| 433,800 | Mayo | Aug. 5, 1890 |
| 465,018 | Foote | Dec. 15, 1891 |
| 941,537 | Savy | Nov. 30, 1909 |
| 1,125,654 | Cleveland | Jan. 19, 1915 |
| 1,608,302 | Cloud | Nov. 23, 1926 |
| 1,608,942 | King et al. | Nov. 30, 1926 |
| 1,677,526 | Marshall | July 17, 1928 |
| 1,892,670 | Jaeger | Jan. 3, 1933 |
| 2,109,301 | Nakane | Feb. 22, 1938 |
| 2,246,675 | Gronemeyer | June 24, 1941 |
| 2,262,640 | Greer | Nov. 11, 1941 |
| 2,308,027 | Robinson | Jan. 12, 1943 |
| 2,358,292 | Malhiot | Sept. 12, 1944 |
| 2,405,947 | Gettig | Aug. 20, 1946 |